United States Patent
Karidi et al.

(10) Patent No.: US 6,501,565 B1
(45) Date of Patent: Dec. 31, 2002

(54) METHOD AND APPARATUS FOR SMOOTHING TEXT OUTLINES

(75) Inventors: Ron J. Karidi, Chicago, IL (US); Lai Chee Man, San Mateo, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 56 days.

(21) Appl. No.: 09/721,404

(22) Filed: Nov. 21, 2000

Related U.S. Application Data

(63) Continuation-in-part of application No. 09/111,633, filed on Jul. 7, 1998.

(51) Int. Cl.⁷ .............................................. H04N 1/407
(52) U.S. Cl. ..................... 358/1.9; 358/3.27; 382/264; 382/266; 382/269
(58) Field of Search ................................. 382/254, 260, 382/264, 266, 269; 345/611; 348/607, 618, 619; 358/1.1, 1.9, 3.27

(56) References Cited

U.S. PATENT DOCUMENTS

| | | | |
|---|---|---|---|
| 5,050,227 A | * 9/1991 | Furusawa et al. | 382/269 |
| 5,200,931 A | 4/1993 | Tai | 358/298 |
| 5,204,753 A | 4/1993 | Tai | 358/298 |
| 5,239,390 A | 8/1993 | Tai | 358/458 |
| 5,260,807 A | 11/1993 | Tai | 358/456 |
| 5,276,531 A | 1/1994 | Chen et al. | 358/443 |
| 5,313,309 A | 5/1994 | Tai et al. | 358/455 |
| 5,327,524 A | 7/1994 | Ng | 395/108 |
| 5,497,236 A | 3/1996 | Wolff et al. | 358/296 |
| 5,559,530 A | 9/1996 | Yamashita et al. | 345/136 |
| 5,563,626 A | 10/1996 | Speed | 345/141 |
| 5,625,460 A | 4/1997 | Tai | 358/298 |
| 5,694,224 A | 12/1997 | Tai | 358/455 |
| 5,719,967 A | * 2/1998 | Sekine | 382/266 |
| 5,729,632 A | 3/1998 | Tai | 382/237 |
| 5,757,982 A | 5/1998 | Tepmongkol | 382/298 |
| 5,790,711 A | * 8/1998 | Murakami | 382/267 |
| 5,793,406 A | 8/1998 | Trask et al. | 347/252 |

FOREIGN PATENT DOCUMENTS

| | | | |
|---|---|---|---|
| EP | 708 415 | 4/1996 | G06T/3/40 |
| EP | 719 034 | 6/1996 | H04N/1/409 |
| EP | 794 656 | 9/1997 | H04N/1/407 |
| EP | 892 549 | 1/1999 | H04N/1/405 |
| EP | 598 104 | 4/1999 | H04N/1/40 |

* cited by examiner

Primary Examiner—Thomas D. Lee

(57) ABSTRACT

Methods and apparatus are provided to smooth a jagged outline of a reconstructed text generated through any of a variety of systems, such as, for example, an image scanner. Given the reconstructed text with a jagged outline, the methods smooth the outline of the text first through location of horizontal and vertical edges, and subsequent gray scale reconstruction of the edge ink level from a one-bit or a low number of bits edge pattern. The methods then provide identification of the local text outline pattern and corresponding ink level adjustment of the center pixel. The methods produce text having very smooth horizontal and vertical edges. The methods then smooth slanted edges, mend holes in the text, and remove isolated pixels of ink.

19 Claims, 4 Drawing Sheets

METHOD AND APPARATUS FOR SMOOTHING TEXT OUTLINES

CROSS-REFERENCE TO RELATED APPLICATIONS

This application is a continuation-in-part of R. Karidi, Text Enhancement System, U.S. patent application Ser. No. 09/111,633, filed Jul. 7, 1998.

BACKGROUND OF THE INVENTION

1. Technical Field

The present invention relates to image text smoothing. More particularly, the present invention relates to a method and apparatus for producing text images with improved smoothness in horizontal, vertical, and slanted edges, and for hole mending and dot removal.

2. Description of the Prior Art

Text or pictorial images are often replicated or transmitted by a variety of techniques, such as photocopying, facsimile transmission, and scanning images into a memory device. The process of replication or transmission often tends to degrade the resulting image due to a variety of factors. Degraded images are characterized by indistinct or shifted edges, blended or otherwise connected characters and distorted shapes.

A reproduced or transmitted image that is degraded in quality may be unusable in certain applications. For example, if the reproduced or transmitted image is to be used in conjunction with a character recognition apparatus, the indistinct edges, connected characters, etc. may preclude accurate or successful recognition of characters in the image. Also, if the degraded image is printed or otherwise rendered visible, the image may be more difficult to read and less pleasing to the eye.

There are several approaches to improve image quality. A classical resolution enhancement algorithm for example, is template matching. Template matching attempts to match a line, curve pattern, or linear pattern and then tries to find the best way to reconstruct it with the printing resolution.

However, after an image has been reconstructed using an enhancement technique, jagged outlines, holes, and undesired dots may still occur in the resulting reconstructed image. It is desirable to smooth these unwanted jagged outlines, and to eliminate unwanted holes and dots.

The prior art teaches smoothing techniques only for corners and diagonals. Also, the prior art assumes one-bit input. The prior art was used primarily within or in conjunction with resealing processes.

H. Yamashita, M. Matsumiya, and T. Fukushima, Image Data Processing Apparatus, U.S. Pat. No. 5,559,530 (Sep. 24, 1996) discloses an image data processing apparatus for generating a font with contour lines expressed with gradations that comprises a font ROM for storing a binary font data. An output port is provided for reading a target pixel with ambient pixels arranged in a 3×3 matrix of the binary font data stored in the font ROM. A shift register produces an address data based on the binary data read from the font ROM. A look-up table has $2^{3 \times 3}$ elements in which multilevel values are commensurate with the pixel patterns included in the 3×3 matrix. One data of the multilevel data is output from the look-up table by designating one element by said address data, and is used as a gradation data of the target pixel. Thus, the font pixel can be expressed with a gradation and the jagged contour of the font is reduced.

The Yamashita et al teachings assume smoothing bit-map image data. That is, Yamashita et alteaches generating multilevel data values from bit-map image data values wherein the bit-map image data values correspond to respective pixels. Each of the pixels has a respective binary level and includes four sub-areas, each of which correspond to a respective sub-pixel.

Also, Yamashita et al teaches a conversion table having $2^{3 \times 3}$ elements, wherein each one of said $2^{3 \times 3}$ elements includes a set of density data values that are arranged in a 2×2 matrix and in a predetermined order. The density data values are calculated from the percentage of the black area of a sub-area of each of the sub-pixels, wherein the area is based on one or more main contour lines which is predicted from the positions of black pixels in the matrix-shaped area, and the sub-pixels, being 2×2 sub-divisions of the pixel area of the target pixel.

L. Zeng, *Improved character smoothing in scanners/printers,* European Patent Application EP 0 719 034 A1, (Jun. 12, 1995) discloses a scanner/printer system for smoothing the edges of text or line art. The system has a copyboard for an image bearing an original, a CCD, a PCI bus, a processor which uses edge smooth software and a laser printer. The edge smooth software adds variable size fill-in patterns of pixels to the image data scanned by the CCD at low resolution to smooth the edges of text or line art prior to printing at high resolution.

Zeng teaches smoothing curves and diagonals, and smoothing many different sizes of corners and chinks, and using one-bit printing. The Zeng teachings require orientation estimation for many different angles.

It would be advantageous to provide a method and apparatus that minimizes the modification of data, i.e. is as faithful to the original input as possible.

It would be advantageous to provide a method and apparatus that recognizes and handles outliers or degraded, jaggy or otherwise corrupt original data, especially with respect to vertical and horizontal edges.

It would be advantageous to provide a method and apparatus that recognizes and handles outliers or degraded, jaggy, or otherwise corrupt original data from non-ideal source inputs, such as, for example half-tone text edges or scanned text.

It would be advantageous to provide a method and apparatus that is fast, simple, and flexible.

It would be advantageous to provide a method and apparatus that provides general enhancements comprising, for example, hole-filling, isolated dot removal, and anti-aliasing.

It would be advantageous to provide a conversion table that is organized by jaggy levels with a preference for minimal change. That is, jaggy level zero dominates.

It would be advantageous to provide a conversion table that provides a final output ink level for a center pixel as a function of its original ink level, and as a function of the surrounding ink and background pattern. Such table provides substantially different output ink from other tables for a particular ink and background pattern, depending on the original center ink level.

It would be advantageous to provide a conversion table and its use by organizing the table efficiently into distinct patterns using concepts of rotation, reflection, and complements.

SUMMARY OF THE INVENTION

Methods and apparatus are provided to smooth a jagged outline of reconstructed text generated through any of a variety of systems, such as, for example, an image scanner. Given the reconstructed text with a jagged outline, the methods smooth the outline of the text first through location of horizontal and vertical edges, and subsequent gray scale reconstruction of the edge ink level from a one-bit or a low number of bits edge pattern. The methods then provide identification of the local text outline pattern and corresponding ink level adjustment of the center pixel. The methods produce text having very smooth horizontal and vertical edges. The methods then smooth slanted edges, mend holes in the text, and remove isolated pixels of ink.

DETAILED DESCRIPTION OF THE INVENTION

Figure 1:
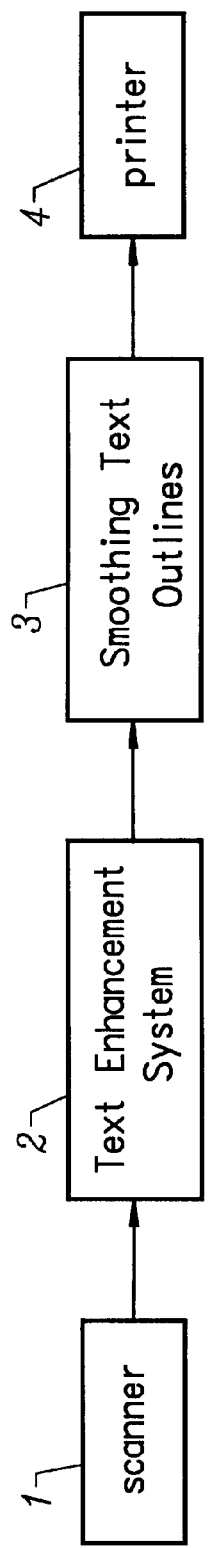
FIG. 1 is a flow diagram of an application of a preferred embodiment of the invention.

Methods and apparatus are provided to smooth a jagged outline of reconstructed text generated through any of a variety of systems, such as, for example, an image scanner. Given the reconstructed text with a jagged outline, the methods smooth the outline of the text first through location of horizontal and vertical edges, and subsequent gray scale reconstruction of the edge ink level from a one-bit or a low number of bits edge pattern. The methods then provide identification of the local text outline pattern and corresponding ink level adjustment of the center pixel. The methods produce text having very smooth horizontal and vertical edges. The methods then smooth slanted edges, mend holes in the text, and remove isolated pixels of ink.

Smoothing of Text Outline

The preferred embodiment is designed to smooth the jagged outline of text generated through the text-enhancement method described in patent application to R. Karidi, Text Enhancement System, Ser. No. 09/111,633, filed Jul. 7, 1998.

Some of the teaching of the Text Enhancement System in the patent application cited herein above is provided herein below for the convenience of the reader. It should be appreciated that the claimed invention herein is by no means limited to using the Text Enhancement System. Furthermore, it is noted that the invention can work with other text enhancement methods, or even without a text enhancement method. However, in either case, the text in the claimed invention herein is required to have dark contour around it.

The Text Enhancement System

The text enhancement system cited herein comprises an easy to use page processing system that enhances the text on a digitally scanned page, thereby improving the crispness, clarity, and readability of the text. In addition, the text enhancement system is independent of the type of scanner used and utilizes an ink redistribution system that increases the contrast of digitally scanned text or facsimiles.

A preferred embodiment of the text enhancement system provides a general purpose method for text enhancement that is independent of the type of scanner that is used to scan a document or the device printing the document. It is tolerant of the artifacts and defects that the scanning process introduces on the text, mainly blurring. The text enhancement system is ideal for image reconstruction systems for scanned or digitized images that are not synthetic, i.e., the image is not a result of any PostScript or Page Description Language (PDL) processing.

Typically, a page is scanned and a digitized image is obtained that is usually in an RGB format. If no specific enhancement procedures are applied to the text in the document, then the result is text that is not crisp, clear, or sharp and is therefore harder to read and less pleasant to the eyes.

The text enhancement system cited herein preserves the amount of ink on the textual part of the page using a consistent method. The text is reconstructed through the reallocation of ink. There is a correspondence between the original amount of ink on the document and the intensity of the ink that the scanner read. The correspondence is either the same or there is some scaling factor involved. The factor is obtained by the fact that there is some overlap between two scanned pixels. The factor is also independent of the location of the pixels.

The new textual image is reconstructed where the same amount or a factor of the ink is preserved. Text has a centralization property. The ink is centralized, that is, there are rarely holes in groups of dark pixels. For example, there is a large white area surrounded by a black area in the letter "O" but it is not at the pixel level, it is at a multi-pixel level. If there are eight pixels that are black surrounding one pixel that is white, then it is likely that the white area is a misread by the scanner and there are actually nine pixels that are black.

The ink on the page is arranged so that it is more centralized, more connected to other pixels that are dark.

A window of size W×W is constructed on a scanned page with the target pixel at the center of the window. The amount of ink in the window is calculated and the number of pixels that are darker than the center pixel is counted. The window is moved along the page and each pixel on the page has a chance to be the center of a window and be allocated ink.

The text enhancement system cited herein reallocates the amount of ink in full quantities of the darkest value. Only the center pixel will actually have its ink reallocated.

This reallocation is a key feature of the text enhancement system cited herein. First, attempt to allocate the ink pixel by pixel in the window. The darkest pixel gets ink, the second darkest gets ink, and so on, until there is no more inkremaining in the bank, where the initial amount of ink in the bank is equal to the total amount of ink in the window. If the center pixel is later in darkness and there is no ink left in the bank, then it will become white. If the center pixel is reached before the ink runs out, then it will become black. Only the reallocation to the center pixel becomes effective. The attempt to allocate ink to the other pixels in the window is only done to determine the center pixel's allocation. Those pixels are reallocated ink when they become the center of a current window. The text enhancement system cited herein is not limited to black text on a white background, it also applies to grayscale, color, and white text on a black background.

For example, the amount of ink in a window is ten and the center pixel is the third darkest in the window. This means that only two other pixels in the window are darker than the center pixel. The text enhancement system cited herein reallocates the ink to the pixels. Given this example, it is desirable to have the center pixel black. If the amount of ink in the window were only three and the center pixel was sixth in darkness, then no ink would be put in the center pixel because reallocating the amount of ink in the window would not leave any for that pixel.

It is also noted that the claimed invention herein assumes the availability of multiple-bit printing. It can be applied to other jagged text outlines that resemble, but are not limited to, one-bit or low number of bits text reconstruction.

FIG. 1 is a flow diagram of an application of a preferred embodiment of the invention. A text image is scanned into a scanner 1. The text image is enhanced by a Text Enhancement System 2, which provides the enhanced image as input into the claimed invention, Smoothing Text Outlines 3. Smoothing Text Outlines 3 then smoothes the outlines of the text image according to the invention and provides the resulting image as input into a printer 4.

Figure 1A:
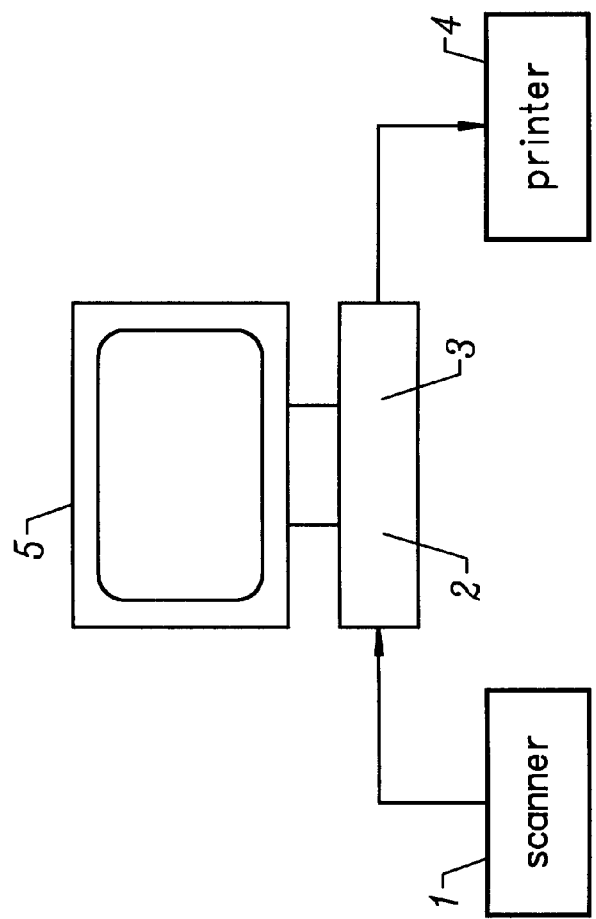
FIG. 1a is a diagram of associated devices for FIG. 1.

FIG. 1a is a diagram of associated devices for FIG. 1. FIG. 1a shows an embodiment of the claimed apparatus. The scanner 1 provides input to a computing device 5, comprising the Text Enhancement System 2, and the claimed invention, Smoothing Text Outlines 3. That is, residing in computing device 5 are means for locating horizontal and vertical edges of text images, means for smoothing the horizontal and vertical edges, means for locating slanted edges of the text images, and means for smoothing the slanted edges. Computing device 5 thus provides the output of the Smoothing Text Outlines 3 as input to the printer 4. Computing devices can be, for example, stand-alone computers, image processing chips, and the like.

Figure 1B:
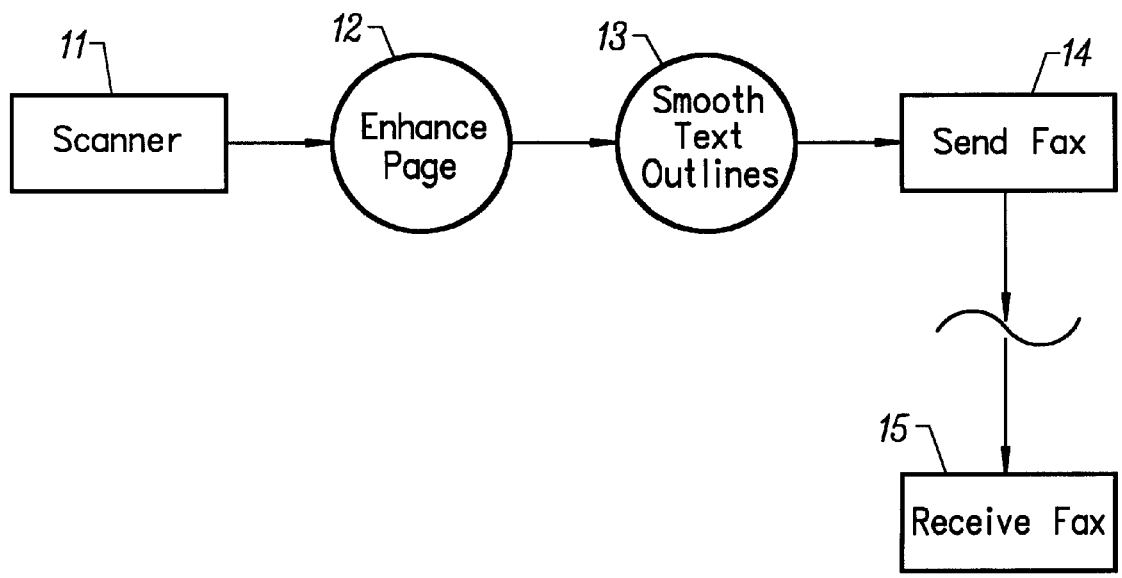
FIG. 1b is a flow diagram of an application of a preferred embodiment of the invention.

FIG. 1b is a flow diagram of an illustrative application of a preferred embodiment of the invention. A document is scanned into a scanner (11). The pages of the scanned image are enhanced (12). The text of the enhanced image is smoothed according to the preferred embodiment of the invention (13). The smoothed image is faxed (14) to a desired destination and received (15) at the destination.

It is appreciated that the claimed invention is not limited to scanner, printer, and fax devices, but can be used with a variety of utility devices.

Figure 2:
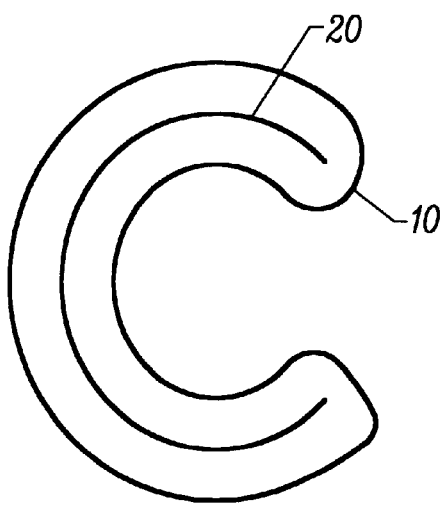
FIG. 2 is a diagram of a text outline according to the invention.

FIG. 2 is a diagram of a text outline 10 of a typical text image, letter C 20 according to the invention.

Figure 3:
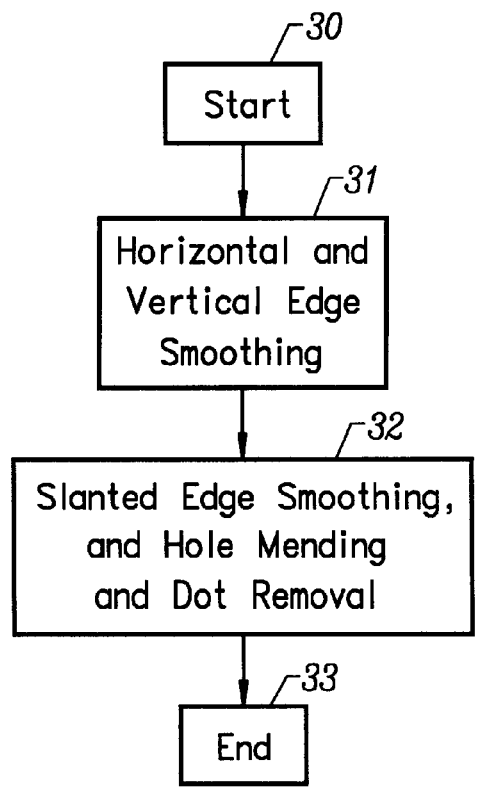
FIG. 3 is a flow diagram of a method according to the invention.

Given a reconstructed text with jagged outline, the preferred embodiment smoothes the outline of the text through two main separate procedures, as depicted in FIG. 3. The smoothing method starts (30) and invokes the first main procedure, identifying the precise location of horizontal and vertical edges and performing subsequent gray-scale reconstruction of the edge ink-level from an edge pattern (31). It is noted that the eye is more sensitive to text outline jaggedness in both the horizontal and vertical direction. The second procedure, identifying the local text outline pattern and corresponding ink-level adjustment of the center pixel (32), is subsequently invoked. Then the method ends (33).

Step (31) produces text with smooth horizontal and vertical edges. Step (32) smoothes slanted edges, i.e. similar to anti-aliasing, and also helps to mend holes in the text and remove isolated pixels of ink.

Horizontal and Vertical Edge Smoothing

In the preferred embodiment, at each pixel around a text outline we look at a 3×N neighborhood for horizontal edge detection and an N×3 neighborhood for vertical edge detection of the pixel. The Text Enhancement System cited herein identifies the text outline through a tag in the output. N is chosen to be 7. Other values for N can be used, but N=7 is chosen for the following reasons. First of all, N is chosen to be odd for obtaining symmetry. Then, if N is too small, it is less likely to be able to detect vertical and horizontal edges. If N is too large, then computation is increased unnecessarily because little or no improved performance is gained. N=5 is another value that can be used, but N=7 is found to be more robust. A threshold ink-level, $T_{dark}$ is chosen such that any pixel darker than $T_{dark}$ is considered part of the text while the rest of the pixels are consider part of the background. The precise value of $T_{dark}$ is not very critical because it is assumed that the original text has sharp jagged outlines so that ink pixels and background pixels are easily distinguished.

According to the preferred embodiment, a horizontal edge is identified by the following condition. In a 3×N window, if the first row contains at least N−n ink pixels and the last row at least N−n background pixels or vice versa, where n is the number of outliers allowed, then the middle row is detected as the precise edge location, subject to the further condition that the outlying pixels cannot be directly above or below the center of the window. That is, outliers on the central column of the window are not permitted. In the preferred embodiment, N=7 and n=1.

A vertical edge is identified similarly by using an N×3 window and by counting ink and background pixels in columns instead of in rows.

Once a horizontal or a vertical edge is detected, the ink value of the center pixel in the window is replaced by a convenient average of the ink values on the edge. As an example of finding such a convenient average of ink values on a horizontal edge, the ink values of ink pixels darker than $T_{dark}$ in the middle row are summed and the sum is divided by N. Other averaging techniques can be used.

Following is an example of a preferred embodiment of the invention, wherein $T_{dark}=175$, and 8-bit printing is assumed. Table A herein below is a 3×7 window of ink and background pixels that is input to the herein claimed invention. The ink pixels and the background pixels are subsequently binarized. That is, each pixel is identified as 0 to denote it is a background pixel or as 1 to denote it is an ink pixel, using $T_{dark}$ as the threshold criteria to distinguish between ink and background pixels. Table B herein below depicts the respective ink and background binary values for the pixels in Table A.

TABLE A

| 230 | 240 | 34 | 192 | 199 | 222 | 210 |
|-----|-----|----|-----|-----|-----|-----|
| 71  | 201 | 54 | 44  | 223 | 231 | 20  |
| 34  | 45  | 55 | 21  | 220 | 17  | 33  |

TABLE B

| 1 | 1 | 0 | 1 | 1 | 1 | 1 |
|---|---|---|---|---|---|---|
| 0 | 1 | 0 | 0 | 1 | 1 | 0 |
| 0 | 0 | 0 | 0 | 1 | 0 | 0 |

Table B shows that the top row is identified as dark because it has 6, or greater than or equal to N−n ink pixels, and wherein the single outlying pixel (the third pixel) is not located in the central column. Table B shows that the bottom row as light. The middle row is therefore identified as a horizontal edge and the ink value of the center pixel of the window is replaced by:

(201+223+231)/7=93.

Slanted Edge Smoothing and Hole Mending/Dot Removal

In the preferred embodiment, each pixel has a 3×3 neighborhood that is considered. The region is binarized into ink and background pixels using the threshold $T_{dark}$. For each pattern of 9 ink or background pixels in the window, a smoothing level is assigned with values ranging from 0 to 3. The ink value of the center pixel is then modified in accordance to this smoothing level, which is also described in Table C herein below.

TABLE C

| Class of Center Pixel | Ink | Background |
|---|---|---|
| Smoothing Level | | |
| 0 | no change | no change |
| 1 | reduce ink by 255-ink | increase ink by half of 255-ink |
| 2 | reduce ink by twice of 255-ink | increase ink by ⅔ of 255-ink |
| 3 | replace ink by 15 | replace ink by 235 |

The distinct ink and background patterns in the preferred embodiment and their corresponding smoothing levels, herein also referred to as jaggy levels, are given in Table D herein below. Patterns that are related to one another through a rotation or a reflection are assigned the same smoothing level. Only one of them is listed herein below in Table D. Furthermore, this list in Table D only shows those cases wherein the center pixel is an ink pixel. The smoothing level of the center pixel when it is a background pixel can be deduced from the binary complement of the list given in Table D.

TABLE D (0 = background, 1 = ink)

Level 0

111111111111111111111111110111111111
111011111011011011010111111011010011
111111011011011011110100111100110010
110011111110110110111110110101011010
011011010011011111010010011011011011
011011101101110010100110100100100110
011111011110010000000001000001001001
010010011011111110111110111110110010
110010010001010011001100010010001101
000000000001
110110111010
010001000100

Level 1

111111101000000000000
011011010110110010110
001000101110101100100

Level 2

100000000
110110010
100000101

Level 3

000
010

Figure 4:
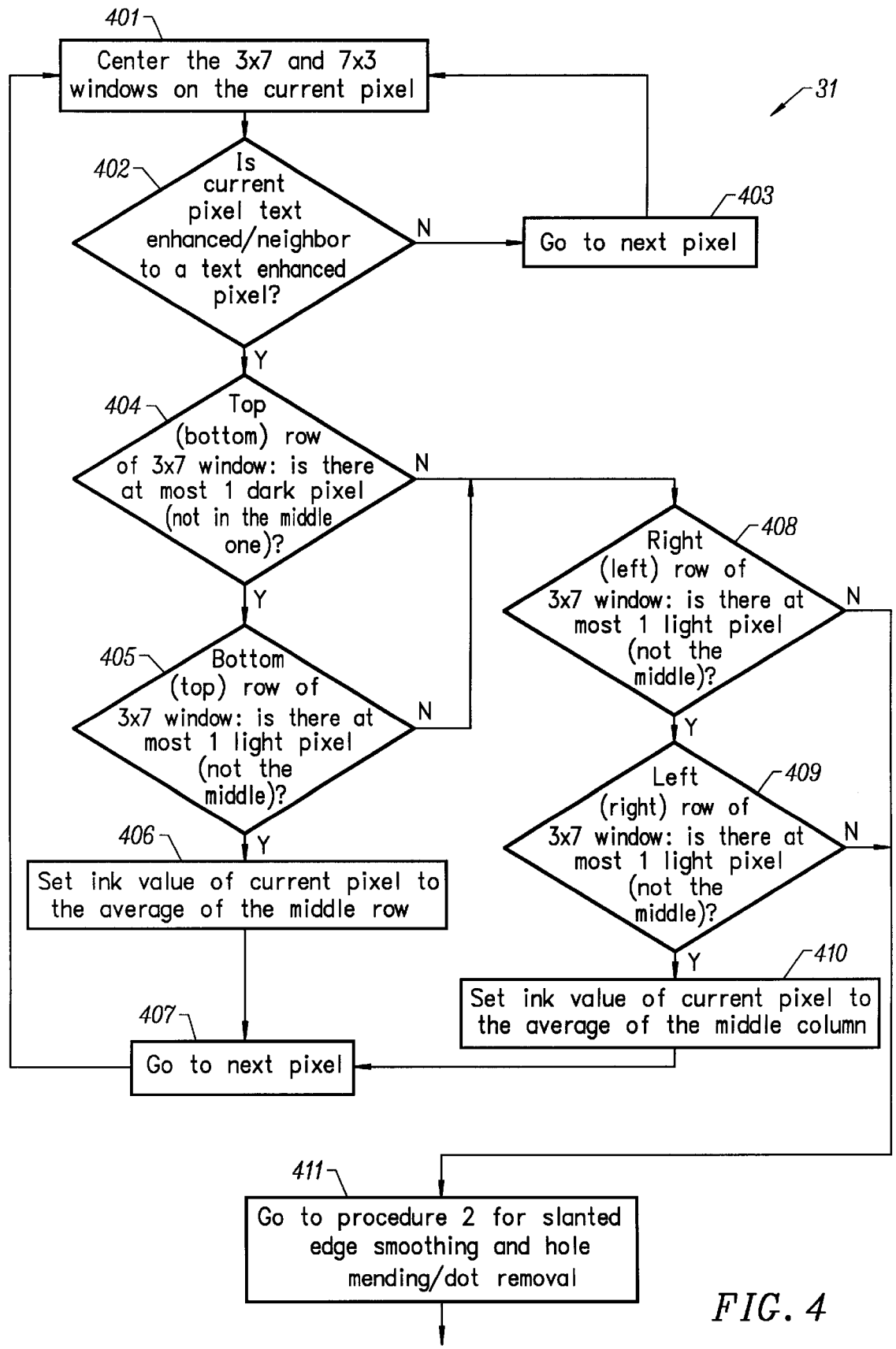
FIG. 4 is a flow diagram of a first main procedure according to the invention.

FIG. 4 is a flow diagram of a first main procedure 31 that performs horizontal and vertical edge smoothing on a pixel from a text enhancement system according to the preferred embodiment of the invention. The method centers a 3×7 window and a 7×3 window on a current pixel (401). The method then determines if the current pixel is a text enhanced or a neighbor to a text enhanced pixel (402). If it is not, then the method goes to the next pixel (403).

If the current pixel is a text enhanced or a neighbor to a text enhanced pixel, then the method examines the top or bottom row of the 3×7 window and determines if there is at most one dark pixel exceeding $T_{dark}$, wherein the dark pixel is not the middle pixel (404). If there is at most one dark pixel, wherein the dark pixel is not the middle pixel, then the method examines the other top or bottom row of the 3×7 window and determines if there is at most one light pixel less than $T_{dark}$, wherein the light pixel is not the middle pixel (405). If there is at most one light pixel, wherein the light pixel is not the middle pixel, the method then sets the ink value of the current pixel to an average of the ink values of the middle row (406). The method then goes to the next pixel (407).

If there is not at most one light pixel, wherein the light pixel is not the middle pixel, and if there is not at most one dark pixel, wherein the dark pixel is not the middle pixel, then the method examines the right or left column of the 7×3 window and determines if there is at most one dark pixel, wherein the dark pixel is not the middle pixel (408). If there is at most one dark pixel, wherein the dark pixel is not the middle pixel, then the method examines the other right or left column of the 7×3 window and determines if there is at most one light pixel, wherein the light pixel is not the middle pixel (409). If there is at most one light pixel, wherein the light pixel is not the middle pixel, the method sets the ink value of the current pixel to an average of the ink values of the middle column (410) and goes to the next pixel (407).

If there is not at most one dark pixel, wherein the dark pixel is not the middle pixel (408), and if there is not at most one light pixel, wherein the light pixel is not the middle pixel (409), the method goes on to a second main procedure that performs slanted edge smoothing, and hole mending and dot removal (411) described herein below.

Figure 5:
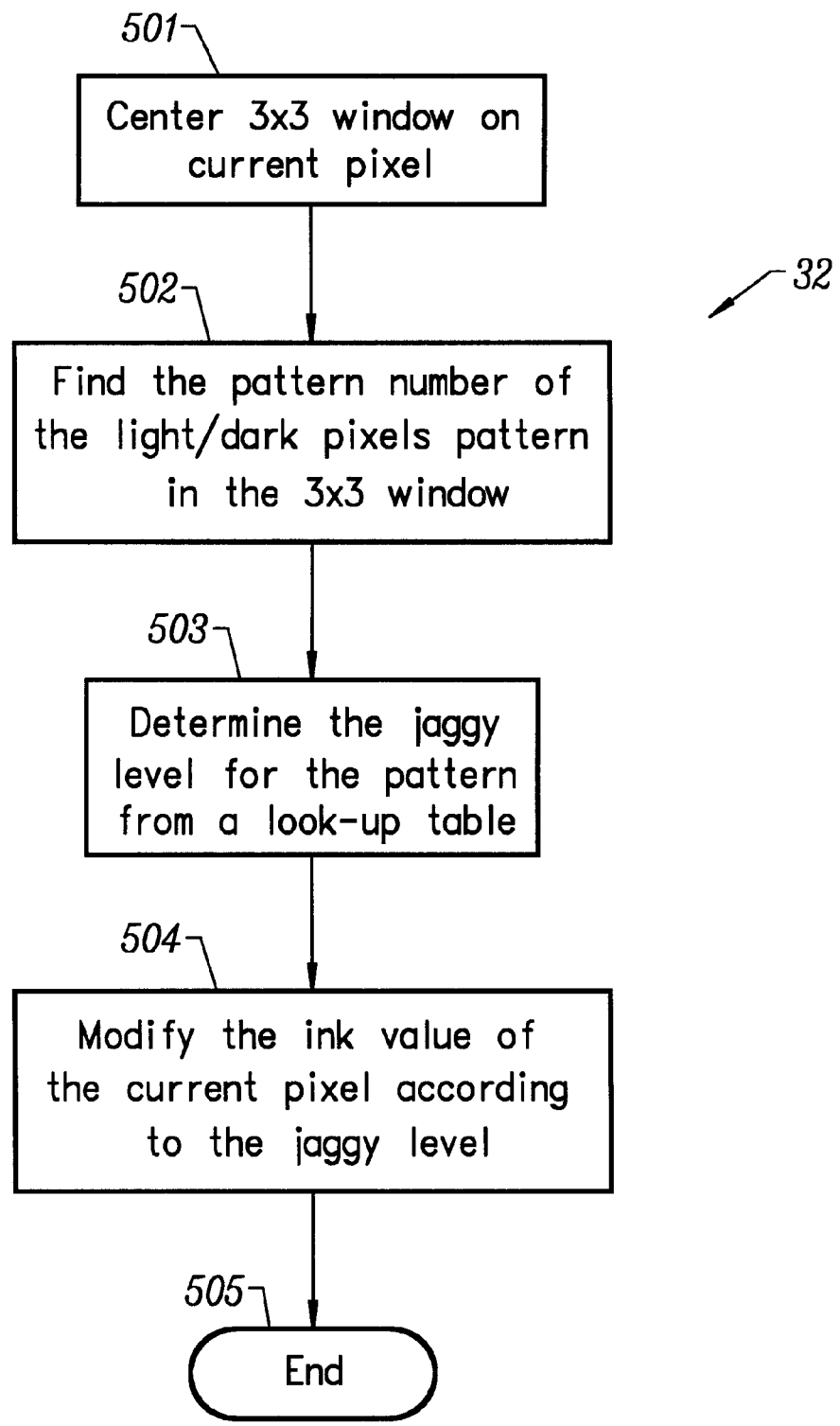
FIG. 5 is a flow diagram of a second main procedure according to the invention.

FIG. 5 is a flow diagram of a second main procedure 32 that performs slanted edge smoothing, and hole mending and dot removal according to the preferred embodiment of the invention. The method centers a 3×3 window at the current pixel (501). Then the method finds the pattern number of the light and dark pixels pattern in the 3×3 window (502). The method then determines the jaggy level for the pattern from a look-up conversion table (503). The look-up conversion table's contents are jaggy levels, which herein are 0, 1, 2, and 3. It is noted that the look-up conversion table cited herein can be created by empirical trial and error methods. The method then modifies the ink value of the current pixel according to the jaggy level (504). The method then ends (505).

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

What is claimed is:

1. A method for smoothing a jagged outline of a text image, the method comprising:

locating horizontal and vertical edges of said text image, wherein for each pixel of said jagged outline:
centering a 3×N window and an N×3 window on said outline pixel;
determining for each pixel of said 3×N window and said N×3 window if said window pixel is an ink pixel or part of a background, wherein said ink pixel is part of said text image;

determining from said 3×N window if a first row contains at least N−n ink pixels and if a last row contains at least N−n background pixels, or determining if said first row contains at least N−n background pixels and if said last row contains at least N−n ink pixels, wherein n is a number of outliers allowed, and thereby determining a middle row as a horizontal edge; and determining from said N×3 window if a first column contains at least N−n ink pixels and if a last column contains at least N−n background pixels, or determining if said first column contains at least N−n background pixels and if said last column contains at least N−n ink pixels, wherein n is a number of outliers allowed, and thereby determining a middle column as a vertical edge;

smoothing said horizontal and vertical edges by providing gray scale reconstruction of each edge pixel ink level of said horizontal and vertical edges using a multiple-bit edge pattern, wherein smoothing said horizontal and vertical edges further comprises:

if said horizontal edge is determined, replacing ink value of said centered outline pixel by an average ink value on said horizontal edge; and if said vertical edge is determined, replacing ink value of said centered outline pixel by an average ink value on said vertical edge; and locating slanted edges of said text image; and smoothing said slanted edges.

2. The method of claim 1, wherein determining if said window pixel is an ink pixel further comprises:

choosing a threshold ink level value, such that if ink value of said window pixel is greater than or equal to said threshold ink value, then said window pixel is an ink pixel, and if said ink value of said window pixel is less than said threshold ink value, then said window pixel is a background pixel.

3. The method of claim 1, wherein N=7 and n=1.

4. The method of claim 3, wherein an allowed outlier pixel of said outlier pixels cannot be directly above or below said centered outline pixel of said horizontal edge or to the right or to the left of said centered outline pixel of said vertical edge.

5. The method of claim 1, wherein said average ink value on said horizontal edge is calculated by summing all ink values of all ink pixels on said horizontal edge and dividing by N, and wherein said average ink value on said vertical edge is calculated by summing all ink values of all ink pixels on said vertical edge and dividing by N.

6. A method for smoothing a jagged outline of a text image, the method comprising:

locating horizontal and vertical edges of said text image;

smoothing said horizontal and vertical edges;

locating slanted edges of said text image, wherein for each pixel of said jagged outline:

centering a 3×3 window on said outline pixel;

determining for each pixel of said 3×3 window if said window pixel is an ink pixel or part of a background, wherein said ink pixel is part of said text image;

identifying a pattern for said 3×3 window;

assigning a smoothing level associated with said pattern, wherein said assigned smoothing level is any of 0, 1, 2, or 3, and wherein:

a smoothing level of 0 indicates no change to an ink value and no change to a background value;

a smoothing level of 1 indicates reduce an ink value by the quantity of 255 minus said ink value and increase a background value by one-half of the quantity of 255 minus said background value;

a smoothing level of 2 indicates reduce an ink value by twice the quantity of 255 minus said ink value and increase a background value by ⅔ of the quantity of 255 minus said background value; and a smoothing level of 3 indicates replace an ink value by 15 and replace a background value by 235; and replacing said ink value of said centered outline pixel by a processed ink value, said processed ink value associated with said smoothing level; and smoothing said slanted edges.

7. Apparatus for smoothing a jagged outline of a text image, comprising:

means for locating horizontal and vertical edges of said text image;

means for smoothing said horizontal and vertical edges, such means comprising means for providing gray scale reconstruction of each edge pixel ink level of said horizontal and vertical edges using a multiple-bit edge pattern;

means for locating slanted edges of said text image;

means for smoothing said slanted edges; and further comprising, for each pixel of said jagged outline:

means for centering an 3×N window and an N×3 window on said outline pixel;

means for determining for each pixel of said 3×N window and said N×3 window if said window pixel is an ink pixel or part of a background, wherein said ink pixel is part of said text image;

means for determining from said 3×N window if a first row contains at least N−n ink pixels and if a last row contains at least N−n background pixels, or means for determining if said first row contains at least N−n background pixels and if said last row contains at least N−n ink pixels, wherein n is a number of outliers allowed, and thereby determining a middle row as a horizontal edge;

if said horizontal edge is determined, means for replacing an ink value of said centered outline pixel by an average ink value on said horizontal edge;

means for determining from said N×3 window if a first column contains at least N−n ink pixels and if a last column contains at least N−n background pixels, or means for determining if said first column contains at least N−n background pixels and if said last column contains at least N−n ink pixels, wherein n is a number of outliers allowed, and thereby determining a middle column as a vertical edged; and if said vertical edge is determined, means for replacing an ink value of said centered outline pixel by an average ink value on said vertical edge.

8. The apparatus of claim 7, wherein means for determining if said window pixel is an ink pixel further comprises:

means for choosing a threshold ink level value, such that if an ink value of said window pixel is greater than or equal to said threshold ink value, then said window pixel is an ink pixel, and if said ink value of said window pixel is less than said threshold ink value, then said window pixel is a background pixel.

9. The apparatus of claim 7, wherein N=7 and n=1.

10. The apparatus of claim 9, wherein an allowed outlier pixel of said outlier pixels cannot be directly above or below said centered outline pixel of said horizontal edge or to the right or to the left of said centered outline pixel of said vertical edge.

11. The apparatus of claim 7, wherein said average ink value on said horizontal edge is calculated by summing all ink values of all ink pixels on said horizontal edge and dividing by N, and wherein said average ink value on said vertical edge is calculated by summing all ink values of all ink pixels on said vertical edge and dividing by N.

12. An apparatus for smoothing a jagged outline of a text image, comprising:

means for locating horizontal and vertical edges of said text image;

means for smoothing said horizontal and vertical edges;

means for locating slanted edges of said text image, such means comprising, for each pixel of said jagged outline:
means for centering a 3×3 window on said outline pixel;
means for determining for each pixel of said 3×3 window if said window pixel is an ink pixel or part of a background, wherein said ink pixel is part of said text image;
means for identifying a pattern for said 3×3 window;
means for assigning a smoothing level associated with said pattern, wherein said assigned smoothing level is any of 0, 1, 2, or 3, and wherein:
a smoothing level of 0 indicates no change to an ink value and no change to a background value;
a smoothing level of 1 indicates reduce an ink value by the quantity of 255 minus said ink value and increase a background value by one-half of the quantity of 255 minus said background value;
a smoothing level of 2 indicates reduce an ink value by twice the quantity of 255 minus said ink value and increase a background value by $\frac{2}{3}$ of the quantity of 255 minus said background value; and
a smoothing level of 3 indicates replace an ink value by 15 and replace a background value by 235; and
means for replacing said ink value of said centered outline pixel by a processed ink value, said processed ink value associated with said smoothing level; and means for smoothing said slanted edges.

13. A method for determining and smoothing a horizontal edge and a vertical edge of a jagged outline of a text image, for each pixel of said jagged outline, the method comprising:

centering an 3×N window and an N×3 window on said each pixel;

determining for each pixel of said 3×N window and said N×3 window if said window pixel is an ink pixel or part of a background, wherein said ink pixel is part of said text image;

determining from said 3×N window if a first row contains at least N−n ink pixels and if a last row contains at least N−n background pixels, or determining if said first row contains at least N−n background pixels and if said last row contains at least N−n ink pixels, wherein n is a number of outliers allowed, and thereby determining a middle row as a horizontal edge;

if said horizontal edge is determined, replacing an ink value of said centered outline pixel by an average ink value on said horizontal edge;

determining from said N×3 window if a first column contains at least N−n ink pixels and if a last column contains at least N−n background pixels, or determining if said first column contains at least N−n background pixels and if said last column contains at least N−n ink pixels, wherein n is a number of outliers allowed, and thereby determining a middle column as a vertical edge; and if said vertical edge is determined, replacing an ink value of said centered outline pixel by an average ink value on said vertical edge.

14. The method of claim 13, wherein determining if said window pixel is an ink pixel further comprises:

choosing a threshold ink level value, such that if an ink value of said window pixel is greater than or equal to said threshold ink value, then said window pixel is an ink pixel, and if said ink value of said window pixel is less than said threshold ink value, then said window pixel is a background pixel.

15. The method of claim 13, wherein N=7 and n=1.

16. The method of claim 15, wherein an allowed outlier pixel of said outlier pixels cannot be directly above or below said centered outline pixel of said horizontal edge or to the right or to the left of said centered outline pixel of said vertical edge.

17. The method of claim 13, wherein said average ink value on said horizontal edge is calculated by summing all ink values of all ink pixels on said horizontal edge and dividing by N, and wherein said average ink value on said vertical edge is calculated by summing all ink values of all ink pixels on said vertical edge and dividing by N.

18. The method of claim 13, wherein said jagged outline of said text image is generated by a text enhancement system, such that each pixel around said jagged outline is identified by a tag given by said text enhancement system output.

19. A method for determining and smoothing a slanted edge of a jagged outline of a text image, for each pixel of said jagged outline, the method comprising:

centering a 3×3 window on said outline pixel;

determining for each pixel of said 3×3 window if said window pixel is an ink pixel or part of a background, wherein said ink pixel is part of said text image;

identifying a pattern for said 3×3 window;

assigning a smoothing level associated with said pattern, wherein said assigned smoothing level is any of 0, 1, 2, or 3, and wherein:
a smoothing level of 0 indicates no change to an ink value and no change to a background value;
a smoothing level of 1 indicates reduce an ink value by the quantity of 255 minus said ink value and increase a background value by one-half of the quantity of 255 minus said background value;
a smoothing level of 2 indicates reduce an ink value by twice the quantity of 255 minus said ink value and increase a background value by $\frac{2}{3}$ of the quantity of 255 minus said background value; and
a smoothing level of 3 indicates replace an ink value by 15 and replace a background value by 235; and replacing said ink value of said centered outline pixel by a processed ink value, said processed ink value associated with said smoothing level.

\* \* \* \* \*